United States Patent [19]
Sanchez

[11] 3,980,275
[45] Sept. 14, 1976

[54] CABLE TENSIONING APPARATUS

[76] Inventor: Anastacio V. Sanchez, 10775 Foothill Blvd., Cupertino, Calif. 95014

[22] Filed: Mar. 26, 1973

[21] Appl. No.: 344,573

Related U.S. Application Data

[63] Continuation-in-part of Ser. No. 227,991, Feb. 22, 1972, Pat. No. 3,749,364.

[52] U.S. Cl................................... 254/67; 254/100
[51] Int. Cl.².......................... B66F 3/10; B66F 3/36
[58] Field of Search ................. 254/67, 78, 98, 100; 81/52.3

[56] References Cited
UNITED STATES PATENTS

| | | | |
|---|---|---|---|
| 396,738 | 1/1889 | Foulke | 254/100 |
| 3,157,074 | 11/1964 | Durkee | 81/52.3 |

*Primary Examiner*—Al Lawrence Smith
*Assistant Examiner*—Robert C. Watson
*Attorney, Agent, or Firm*—Jack M. Wiseman

[57] ABSTRACT

Apparatus for tensioning a cable employed for repairing deformed yieldable structures in which one end thereof has a generally U-shaped configuration. The legs of the U-shaped end is joined by a slotted cross piece to receive in locking engagement therewith a cable to be tensioned. Extending from the U-shaped end is an integrally formed threaded rod. A threaded impact tube receives the rod in threaded engagement therewith. The free end of the impact tube is suitably notched to receive a conventional air operated impact wrench. Between the U-shaped end and the impact tube is an abutment member that has a suitable opening to receive a rod. The abutment member engages a fixed upright post or bar. When the impact wrench rotates the impact tube, the impact tube engages the abutment member to maintain a fixed location longitudinally while rotating about its axis. As a consequence thereof, the rod is drawn into the tube and the U-shaped end applies a tension to the cable attached thereto. In addition thereto, the abutment member is formed with oppositely directed, aligned pivot pins, which are received for pivotal movement within suitable openings in horizontal members of the upright post so that the abutment member can pivot about a vertical axis.

5 Claims, 6 Drawing Figures

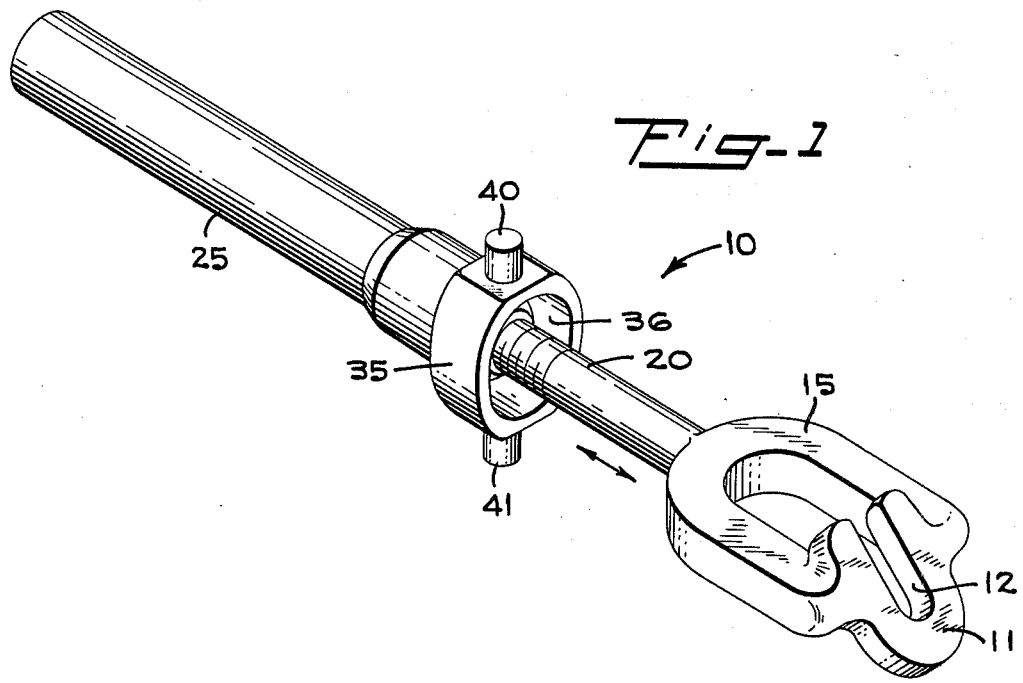
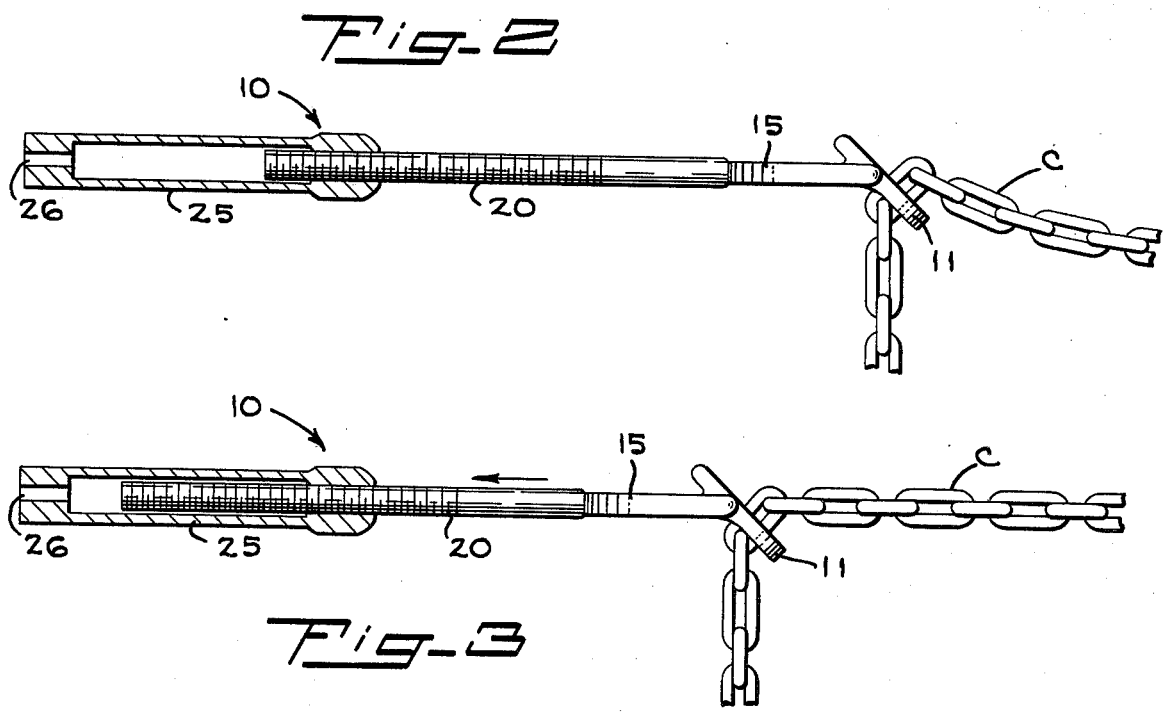

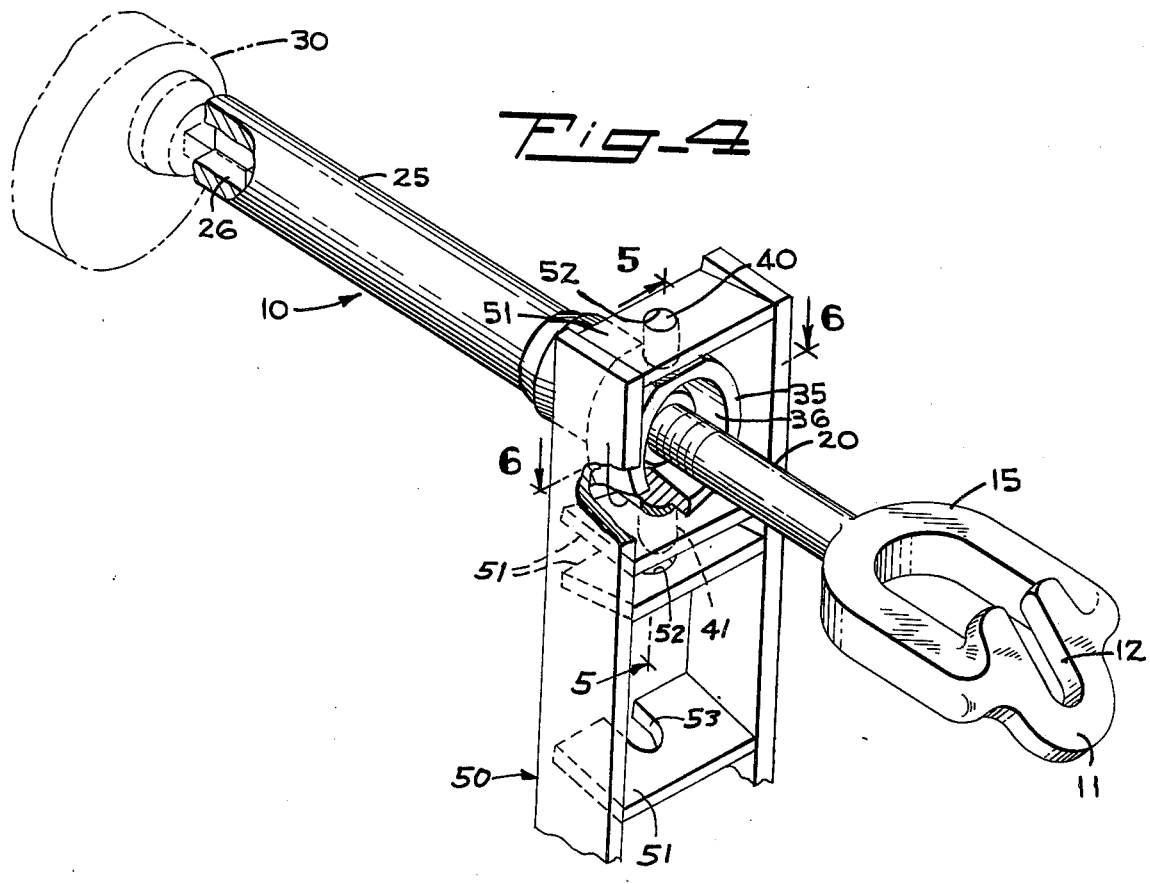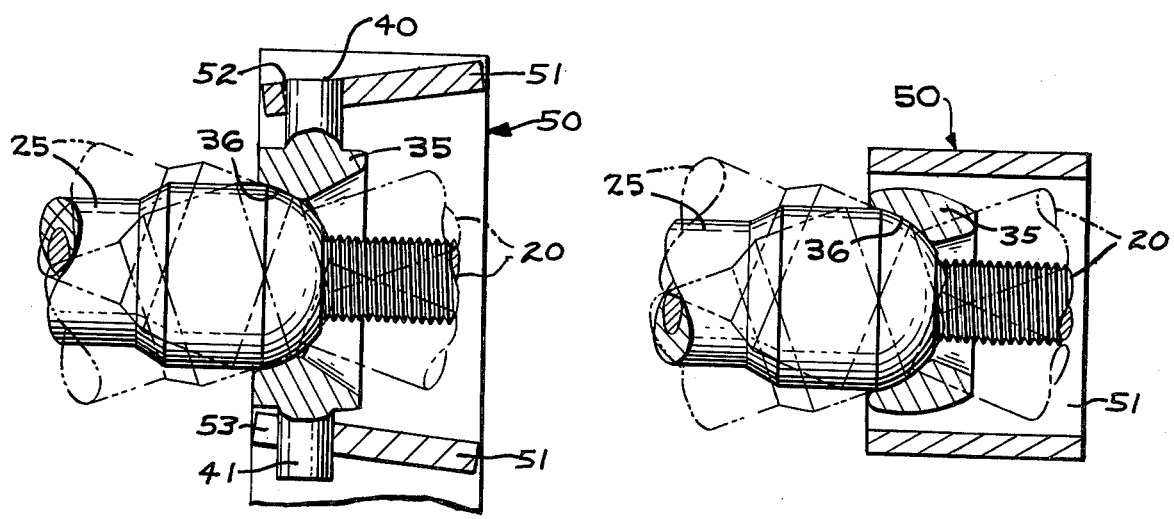

CABLE TENSIONING APPARATUS

RELATED APPLICATION

This application is a continuation-in-part of application, Ser. No. 227,991, filed Feb. 22, 1972, by Anastacio V. Sanchez for Cable Tensioning Apparatus, and had issued into U.S. Pat. No. 3,749,364 on July 31, 1973.

BACKGROUND OF INVENTION

Tension jacks have been heretofore employed in vehicle body repair work to apply tension to cables. However, such tension jacks had many complicated parts and lacked versatility. Consequently, they were overly expensive and were limited in use.

The present inventor has filed applications covering this general area which are as follows:

Ser. No. 14,558, filed Feb. 26, 1970, for Method Of And Apparatus For Repairing Deformed Yieldable Structures, which has issued into U.S. Pat. No. 3,673,842 on July 4, 1972;

Ser. No. 52,213, filed July 6, 1970, for Clamp, which has issued into U.S. Pat. No. 3,669,439 on June 13, 1972;

Ser. No. 202,130, filed Nov. 26, 1971, for Method Of And Apparatus For Repairing Deformed Yieldable Structures; and Ser. No. 202,109, filed Nov. 26, 1971, for Method Of And Apparatus For Repairing Deformed Yieldable Structures.

Patents of interest are:
Neville — U.S. Pat. No. 2,247,642
Neville — U.S. Pat. No. 706,090
Durkee — U.S. Pat. No. 3,157,074
Duke — U.S. Pat. No. 3,247,588

SUMMARY OF INVENTION

Apparatus for tensioning cable in which a threaded rod is received by a threaded tube. The free end of the rod carries a notched member for retaining a cable to be tensioned. An impact wrench engages a suitable notched end of the tube to rotate the same. An abutment member receives the rod and is engaged by the tube to hold the tube in a fixed longitudinal position while rotated about its axis, whereby the rod is drawn into the tube to apply a force to the cable through the notched cable retaining member. The abutment member is pivotally supported by a post or a bar for pivotal movement.

By virtue of the foregoing, inexpensive yet versatile cable tensioning apparatus are provided, which are adaptable for repairing deformed yieldable structures. The tensioning apparatus has pivotal movement relative to a supporting post or bar and the tensioning apparatus is more stably held with a lesser tendency for falling away from the supporting post.

DESCRIPTION OF THE DRAWINGS

FIG. 1 is a perspective view of an apparatus for tensioning cable embodying the present invention.

FIG. 2 is a longitudinal sectional view of the apparatus shown in FIG. 1 with the abutment plate removed to illustrate the threaded engagement between an impact tube and rod thereof.

FIG. 3 is a longitudinal sectional view similar to FIG. 2 to illustrate the movement of the rod within the impact tube.

FIG. 4 is a perspective view of the apparatus shown in FIGS. 1–3 illustrated with an abutment member thereof engaging a stationary post and an impact wrench engaging the free end of the impact tube.

FIG. 5 is a diagrammatic view of the swivel action of the impact tube and rod taken along line 5—5 of FIG. 4.

FIG. 6 is a diagrammatic view of the swivel action of the impact tube and rod taken along line 6—6 of FIG. 4.

DESCRIPTION OF THE PREFERRED EMBODIMENT

Illustrated in FIGS. 1–4 is an apparatus 10 for applying a force to a cable C for tensioning the same. The cable C is in the form of a chain with links. The apparatus 10 comprises a cable retaining member 11 which is slotted at 12 to receive and hold the end of the cable C. Integrally formed with the slotted cable retaining member 11 is a U-shaped end portion 15. The cable retaining member 11 is disposed at an acute angle relative to the legs of the U-shaped end portion 15 and the slot 12. More specifically, the slot 12 is disposed at an acute angle relative to the axis of a threaded rod 20.

Integrally formed with the base of the U-shaped end portion 15 is the threaded rod 20. The rod 20 is received by an impact tube 25. The impact tube 25 is threaded and thus receives the rod 20 in threaded engagement. The free end of the impact tube 25 is suitably notched at 26 (FIG. 4) to receive a conventional impact wrench 30.

Disposed between the U-shaped portion 15 and the impact tube 25 is an abutment member 35 (FIGS. 1 and 4). The abutment 35 is suitably apertured at 36 to freely receive the threaded rod 20. The configuration of the wall surrounding the aperture 36 conforms to the contour of the adjacent end of the impact tube 25 so that the end of the impact tube is nested in the aperture 36 of the abutment member 35 (FIGS. 5 and 6). The abutment member 35 has integrally formed therewith oppositely directed, aligned pivot pins 40 and 41. From FIGS. 5 and 6, it will be observed that the impact tube 25 and the rod 20 have a swivel movement within the abutment member 35.

In practice, the abutment member 35 is supported by a stationary, upright post or bar 50 (FIG. 4) for pivotable movement about a vertical axis. Toward this end, the upright post 50 includes a plurality of vertically spaced horizontally disposed support plates 51. Alternate support plates 51 are formed with a cylindrical opening 52. Alternate support plates 51 are formed with U-shaped openings 53 with the slotted openings 53 facing in the direction of the impact wrench 30. Opposite plates 51 with a cylindrical opening 52 and a U-shaped opening 53 form a pair to receive the pivot pins 40 and 41, whereby the selected plates 51 support the attachment member 35 for pivotal movement about a vertical axis. The pairs of support plates 51 employed to support the attachment member 35 are disposed at an angle and directed toward one another in the direction toward the tube 25.

Thus, the tensioning apparatus of the present invention has greater angle capability for the direction of the tensioning applying rod 20. The various angles at which a force can be applied is varied affording the apparatus of the present invention greater versatility. In addition, there is a lesser tendency for the tensioning apparatus to drop from the post.

The air impact wrench 30 is inserted into a notch 26 of the impact tube to rotate the impact tube 25 about its axis while the impact tube 25 remains in a fixed longitudinal position. As a consequence thereof, the rod 20 is drawn into the tube 25. This action causes the U-shaped portion 15 to apply a force to the cable retaining member 11 which, in turn, exerts a force on the cable C to tension the cable C.

I claim:
1. Apparatus for tensioning a cable comprising:
   a. a tube with an inner threaded wall;
   b. a threaded rod disposed in said tube in threaded engagement with the inner wall thereof, said rod projecting out of said tube;
   c. a cable retaining member carried by said rod for movement therewith;
   d. an abutment member disposed between said cable retaining member and said tube, said abutment member being formed with an aperture for freely receiving said rod and arranged to be engaged by said tube to inhibit axial movement of said tube toward said cable retaining member, said abutment member being formed with aligned, oppositely directed means for imparting pivotal movement to said abutment member, the configuration of a wall surrounding the aperture of said abutment member conforms to the contour of the end of said tube adjacent thereto for nesting said tube in said aperture of said abutment member for swivel movement; and
   e. a post, said post being formed with transversely spaced, longitudinally extending members and transversely disposed, longitudinally spaced members, said transversely disposed members being formed with means cooperating with said oppositely directed means of said abutment member for said transversely disposed members to support said abutment member for pivotal movement.

2. Apparatus for tensioning a cable comprising:
   a. a tube with an inner threaded wall;
   b. a threaded rod disposed in said tube in threaded engagement with the inner wall thereof, said rod projecting out of said tube;
   c. a cable retaining member carried by said rod for movement therewith;
   d. an abutment member disposed between said cable retaining member and said tube, said abutment member being formed with an aperture for freely receiving said rod and arranged to be engaged by said tube to inhibit axial movement of said tube toward said cable retaining member, said abutment member being formed with aligned, oppositely directed means for imparting pivotal movement to said abutment member, the configuration of a wall surrounding the aperture of said abutment member conforms to the contour of the end of said tube adjacent thereto for nesting said tube in said aperture of said abutment member for swivel movement, said aligned, oppositely directed means of said abutment member being pivot pins; and
   e. a post, said post being formed with transversely spaced, longitudinally extending members and transversely disposed, longitudinally spaced members, said transversely disposed members being formed with openings cooperating with said pins of said abutment member for said transversely disposed members to support said abutment member for pivotal movement.

3. Apparatus as claimed in claim 2 wherein the opening of one of said transverse members is a cylindrical opening and the opening for another of said transverse members includes a semi-cylindrical wall.

4. Apparatus for tensioning a cable comprising:
   a. a tube with an inner threaded wall;
   b. a threaded rod disposed in said tube in threaded engagement with the inner wall thereof, said rod projecting out of said tube;
   c. a cable retaining member carried by said rod for movement therewith;
   d. an abutment member disposed between said cable retaining member and said tube, said abutment member being formed with an aperture for freely receiving said rod and arranged to be engaged by said tube to inhibit axial movement of said tube toward said cable retaining member, said abutment member being formed with aligned, oppositely directed means for imparting pivotal movement to said abutment member; and
   e. a post, said post being formed with transversely spaced, longitudinally extending members and transversely disposed, longitudinally spaced members, said transversely disposed members being formed with means cooperating with said oppositely directed means of said abutment member for said transverse members to support said abutment member for pivotal movement.

5. Apparatus for tensioning a cable comprising:
   a. a tube with an inner threaded wall;
   b. a threaded rod disposed in said tube in threaded engagement with the inner wall thereof, said rod projecting out of said tube;
   c. a cable retaining member carried by said rod for movement therewith;
   d. an abutment member disposed between said cable retaining member and said tube, said abutment member being formed with an aperture for freely receiving said rod and arranged to be engaged by said tube to inhibit axial movement of said tube toward said cable retaining member, said abutment member being formed with aligned, oppositely directed means for imparting pivotal movement to said abutment member, said means of said abutment member being pivot pins; and
   e. a post, said post being formed with transversely spaced, longitudinally extending members and transversely disposed, longitudinally spaced members, said transversely disposed members being formed with openings cooperating with said pins on said abutment member for said transverse members to support said abutment member for pivotal movement.

* * * * *